3,458,458
PROCESS FOR THE PREPARATION OF VINYL POLYMER IMPREGNATED NITROCELLULOSE
Ian Ferguson, Troon, Robert Arthur Hall, West Kilbride, and Joseph Park, Stevenston, Scotland, assignors to Imperial Chemical Industries Limited, London, England, a corporation of Great Britain
No Drawing. Filed Aug. 11, 1966, Ser. No. 571,696
Claims priority, application Great Britain, Aug. 20, 1965, 35,780/65
Int. Cl. C08b 21/14
U.S. Cl. 260—17
20 Claims

ABSTRACT OF THE DISCLOSURE

There is provided a vinyl-impregnated nitrocellulose wherein a vinyl monomer is impregnated in the nitrocellulose with substantially preserving the original structure of the nitrocellulose. The nitrocellulose is contacted with a liquid medium having a vinyl monomer dissolved therein, but which medium has substantially no solvent action on the nitrocellulose. Preferably, the liquid medium comprises water, an alcohol and the vinyl monomer.

---

This invention relates to a process for the preparation of nitrocellulose impregnated with one or more polymerisable vinyl compounds in polymeric form and to the modified nitrocellulose produced thereby.

In order to enhance the film-forming properties of nitrocellulose, it has been proposed to incorporate vinyl polymer into the nitrocellulose. Such products are especially useful for wood finishes and surface-coatings. Hitherto, the methods of incorporating the vinyl polymer into the nitrocellulose have included mastication of the nitrocellulose with polymeric vinyl material and mixing the nitrocellulose with monomeric vinyl material in a solvent for the vinyl monomer and the nitrocellulose, followed by polymerisation of the monomer and removal of the solvent. In these processes, the original structure of the nitrocellulose was destroyed and it was difficult to obtain the product in a particulate form which could be easily handled.

It is an object of this invention to provide a process for the preparation of vinyl-impregnated nitrocellulose wherein the original structure of the nitrocellulose is substantially preserved. The invention is especially useful for incorporating vinyl monomer into nitrocellulose in particle form without destroying the particulate nature of the nitrocellulose.

In accordance with the invention, a process for the preparation of vinyl-impregnated nitrocellulose comprises contacting the nitrocellulose with vinyl monomer dissolved in a liquid medium which has substantially no solvent action on the nitrocellulose so that the nitrocellulose becomes impregnated with vinyl monomer. The modified nitrocellulose thus prepared may, if desired, be readily separated and dried. The absorbed vinyl monomer may be readily polymerised within the nitrocellulose by heating either before or after the vinyl-impregnated nitrocellulose is separated from the liquid medium. The polymerisation may, for example, be effected after the vinyl-impregnated nitrocellulose is incorporated in a coating and applied to a surface. The product containing polymerised vinyl compound is markedly superior in its properties to nitrocellulose modified by mastication with polymeric vinyl material and we believe that this is due to chemical bonding between the vinyl material and the nitrocellulose.

The vinyl monomer is preferably polymerised in presence of a polymerisation catalyst such as, for example, benzoyl peroxide. The catalyst may be mixed with the nitrocellulose before the latter is contacted with the vinyl monomer but, when the vinyl compound is to be polymerised before separation of the nitrocellulose from the liquid medium, it is generally better to dissolve the catalyst in the liquid medium. Preferably in this case the catalyst is mixed with the vinyl monomer before the monomer is dissolved in the liquid medium.

The process of the invention may be applied to any of the common grades of nitrocellulose, i.e. those having a nitrogen content within the range 10 to 13.5% by weight of nitrogen. The nitrocellulose may be in any of the normal physical forms such as, for example, fibrous or particulate, and it may be in any of the normal viscosity grades. It is especially useful, however, when applied to dense, particulate nitrocellulose. The nitrocellulose may be originally in a dry form or it may be "damped" with water or an organic liquid such as, for example, ethanol or toluene, although water-immiscible "damping" liquids are best avoided since they tend to cause aggregation in a particulate product. Preferably sufficient liquid medium should be used to hold the nitrocellulose in suspension. Although the liquid medium may consists of water only, it is preferable to include therein a water-miscible organic liquid in which the vinyl monomer is soluble, the preferred ratio of water to organic liquid being within the range 1:1 to 19:1. If the proportion of organic liquid is excessive, there is a tendency for the vinyl monomer to remain in the liquid phase instead of migrating into the nitrocellulose. Using the preferred liquid medium, the amount of vinyl monomer which becomes polymerised outside the nitrocellulose is negligible. Preferably the ratio of water to organic liquid should be initially relatively low when the nitrocellulose is first contacted with the dissolved vinyl monomer and should thereafter be diluted by the addition of water to facilitate migration of the monomer into the nitrocellulose.

The water-miscible organic liquid, which may, if desired, be a mixture of liquids, should preferably not be a strong solvent for the nitrocellulose and in any case the liquid medium must have substantially no solvent action on the nitrocellulose. Suitable water-miscible organic liquids for the process include ethanol, n-propanol and isopropanol. Although it is preferable that no water-immiscible organic liquid should be present in the liquid medium, a small amount such as, for example, the amount of water-immiscible liquid used as nitrocellulose "damping" medium may be tolerated.

It is preferred that the vinyl monomer present should be completely dissolved in the liquid medium, i.e. there should be no monomer present as a separate phase, so that concentrated monomer does not contact the nitrocellulose. This ensures that the migration of monomer from the liquid medium to the nitrocellulose is in accordance with normal partition laws. The presence of concentrated monomer tends to give a non-uniform product and to cause aggregation of particulate products. For best results the process should be carried out at an elevated temperature, the preferred temperature being at or near the reflux temperature of the liquid medium. Although the migration of the vinyl monomer into the nitrocellulose is normally rapid compared to the polymerisation of the monomer, it is advantageous in some cases to contact the nitrocellulose with the vinyl monomer at a relatively low temperature at which substantially no polymerisation of the monomer occurs and, if polymerisation of the vinyl monomer is desired at that stage, subsequently to raise the temperature to one at which the monomer polymerises rapidly.

The concentration of vinyl monomer in the liquid medium should preferably not exceed 10% by weight of the liquid medium. Vinyl monomers which give especially useful modified nitrocellulose products include methyl methacrylate, butyl methacrylate, lauryl methacrylate, acrylonitrile, styrene, acrylamide, methacrylamide, ethyl acrylate, dibutyl maleate, dioctyl maleate, methyl acrylate, 2-ethyl hexylacrylate, triethylene glycol dimethacrylate, and mixtures thereof.

Vinyl monomers containing, in addition to the vinyl group, a polymerisable group other than vinyl such as, for example, trimethylolpropane diallyl ether methacrylate, may also be advantageously used in the practice of the invention and this other polymerisable group may be further polymerised, or copolymerised with a further polymerisable compound such as, for example, trimethylene glycol dimethacrylate, either before or after polymerisation of the vinyl group or before or after the impregnated nitrocellulose is compounded into a coating composition and coated on to a surface, to modify the surface properties of the modified nitrocellulose.

The modified nitrocellulose compounds of the invention may be compounded into coating compositions using conventional solvents or they may be compounded in a so-called solventless composition with polymerisable liquid monomers, together with polymerisation catalyst as appropriate, and polymerisation of this liquid monomer may be effected after the compound is applied to a surface, for example, by heating the surface or exposing it to infra-red radition.

The invention is further illustrated by the following examples in which all parts and pertentages are by weight.

EXAMPLE 1

In this example the nitrocellulose used was a dense nitrocellulose having an average nitrogen content in the range 11.5–12.0% in the form of regular shaped particles 1/8" x 1/8" x 1/32". A solution containing 40 grams of this nitrocellulose dissolved in 95 cc. of acetone and 5 cc. of water had a viscosity between 8 and 13 poises at 20° C.

1000 parts of this nitrocellulose damped with 500 parts of water were stirred in 1000 parts of water and 1500 parts of isopropanol. The mixture was heated to 60° C. and 385 parts of ethyl acrylate containing 7.7 parts of benzoyl peroxide added over 30 minutes. 4500 parts of water at 60° C. were added over one hour. The temperature was raised to reflux and maintained there for 2 hours. During the next 2 hours isopropanol and uncoverted monomer were distilled off. The mixture was cooled to 30° C., drained and the resulting granules were dried for 16 hours at 55° C. The product was in the form of single, well-defined granules containing 24% polyethyl acrylate. It was satisfactory for use in surface-coating and wood-finishing lacquers.

EXAMPLE 2

In this example the nitrocellulose used was a dense nitrocellulose having an average nitrogen content in the range 10.5–11.2%, in the form of regular shaped particles 1/8" x 1/8" x 1/32". A solution containing 20 grams nitrocellulose dissolved in 95 cc. acetone and 5 cc. of water had a viscosity between 15 and 25 poises at 20 C.

1000 parts of this nitrocellulose, damped with 500 parts of water, were stirred in 2000 parts of water and 2500 parts of isopropanol. The mixture was raised to 60° C. and 300 parts of caster oil containing 100 parts of methyl methacrylate and 2 parts of benzoyl peroxide added over 30 minutes. 4000 parts of water at 60° C. were added over 1 hour. The temperature was raised to reflux and maintained there for 1½ hours. During the next 2½ hours isopropanol and uncoverted monomer were distilled off. The mixture was cooled to 30° C., drained and the resulting granules were dried for 16 hours at 55° C. The product was in the form of single, well-defined granules containing 26% of castor oil/polymethyl methacrylate.

EXAMPLE 3

In this example 1000 parts of the nitrocellulose used in Example 1, damped with 500 parts of water, were stirred into 1300 parts of water and 1200 parts of isopropanol. The mixture was heated to 60° C. and 170 parts of ethyl acrylate containing 170 parts of dibutyl maleate and 6.8 parts of benzoyl peroxide added over 30 minutes. 3000 parts of water at 60° C. were added over 1 hour. The temperature was raised to reflux and maintained there for 2 hours. During the next 2 hours isopropanol and unconverted monomers were distilled off. The mixture was cooled to 30° C., drained and the resulting granules were dried for 16 hours at 55° C. The product was in the form of single, well-defined granules containing 22% polyethyl acrylate/polydibutyl maleate.

EXAMPLE 4

In this example, 1000 parts of the nitrocellulose used in Example 1, damped with 500 parts of water, were stirred in 1300 parts of water and 1200 parts of isopropanol. The mixture was heated to 60° C. and 170 parts of ethyl acrylate containing 170 parts of dioctyl maleate and 6.8 parts of benzoyl peroxide were added over 30 minutes. 3000 parts of water were added over 1 hour. The temperature was raised to reflux and maintained there for 2 hours. During the next 2 hours isopropanol and unconverted monomers were distilled off. The mixture was cooled to 30° C., drained and the resulting granules were dried for 16 hours at 55° C. The product was in the form of single, well-defined granules containing 24% polyethyl acrylate/polydioctyl maleate.

EXAMPLE 5

In this example, 1000 parts of the nitrocellulose used in Example 1, damped with 500 parts of water, were stirred in 1300 parts of water and 1200 parts of isopropanol. The mixture was heated to 60° C. and 340 parts of acrylamide containing 6.8 parts of benzoyl peroxide added over 30 minutes. 3000 parts of water at 60° C. were added over 1 hour. The temperature was raised to reflux and maintained there for 2 hours. During the next 2 hours isopropanol was distilled off. The mixture was drained and the resulting granules were dried for 16 hours at 55° C. The product was in the form of single, well-defined granules containing 10% polyacrylamide.

EXAMPLE 6

In this example the nitrocellulose used was a dense nitrocellulose having an average nitrogen content in the range 11.5–12.0% in the form of regular shaped particles 1/8" x 1/8" x 1/32". A solution containing 40 grams nitrocellulose dissolved in 95 cc. of acetone and 5 cc. of water had a viscosity between 30 and 50 poises at 20° C.

1000 parts of this nitrocellulose, damped with 500 parts of water, were stirred in 1300 parts of water and 1200 parts of isopropanol. The mixture was heated to 60° C. and 340 grams of 2-ethyl hexylacrylate containing 7.5 parts of benzoyl peroxide added over 30 minutes. 3000 parts of water at 60° C. were added over 1 hour. The temperature was raised to reflux and maintained there for 2 hours. During the next 2 hours isopropanol and unconverted monomer were distilled off. The mixture was cooled to 30° C., drained and the resulting granules were dried for 16 hours at 55° C. The product was in tne form of single, well-defined granules containing 25% poly 2-ethyl hexylacrylate.

EXAMPLE 7

In this example the nitrocellulose used was fibrous nitrocellulose prepared from cotton linters and having an average nitrogen content in the range 11.5–12.0%. A solution containing 40 grams of this nitrocellulose dissolved in 95 cc. of acetone and 5 cc. of water, had a viscosity between 30 and 50 poises at 20° C.

500 parts of this nitrocellulose, damped with 250 parts of water, were stirred in 1550 parts of water and 1200 parts of isopropanol. The mixture was heated to 60° C. and 170 parts of methyl methacrylate containing 3.75 parts of benzoyl peroxide added over 30 minutes. 3000 parts of water at 60° C. were added over 1 hour. The temperature was raised to reflux and maintained there for 2 hours. During the next 2 hours isopropanol and unconverted monomer were distilled off. The mixture was cooled to 30° C., drained and the product dried for 16 hours at 55° C. The product was in the form of soft, fibrous, spherical granules, 1–3 millimetres in diameter, having a polymethyl methacrylate content of 22%.

100 parts of this product were dissolved in 400 parts of methyl methacrylate monomer and 100 parts of hexamethylene diisocyanate, and 8 parts of methylethyl ketone peroxide and 0.2 part of cobalt as cobalt naphthenate dissolved in 20 parts of toluene added. The mixture was thoroughly stirred and applied to wood, glass, metal and other substrates, and then allowed to cure at room temperature. Hard, glossy films were obtained.

EXAMPLE 8

In this example 100 parts of the nitrocellulose as used in Example 6, wetted with 50 parts water, were stirred in 160 parts of water and 140 parts of isopropanol. The temperature was raised to 60° C. and 32 parts of triethylene glycol dimethylacrylate containing 0.1 g. hydroquinone were added over 30 minutes. 500 parts of water were added over 2 hours maintaining the temperature at 60° C. Finally the contents of the vessel were cooled to room temperature, 15–25° C., and the product recovered by filtration. The product was dried at 55° C. to constant weight. The product was in the form of single well-defined granules containing 20% triethylene glycol dimethacrylate.

20 parts of the granules so prepared were dissolved in 80 parts of triethylene glycol dimethacrylate and 2 parts of methylethyl ketone peroxide with .05 part cobalt as naphthenate in 5 parts of toluene. The whole mixture was agitated. The material was then applied to wood, glass and metal substrates, and heated at 60° C. when polymerisation took place. A hard, glossy film was obtained on the substrate.

EXAMPLE 9

100 parts of nitrocellulose as used in Example 8 damped with 50 parts of water were stirred in 160 parts water and 140 parts isopropanol. The temperature was raised to 60° C. and 30 g. of trimethylolpropane diallyl ether methacrylate containing 0.6 parts of benzoyl peroxide were added over 30 minutes. 350 parts of water were then added over one hour with the temperature maintained at 60° C. The temperature was raised to reflux, 83° C., and maintained thereat for three hours. The condenser was then turned to the take-off position and isopropanol and water distilled off until the reaction temperature rose to 99° C. The contents were cooled and the product recovered by filtration. The resulting granules were dried to constant weight at 55° C. The product was in the form of dense white granules containing 20% of trimethylolpropane diallyl ether polymethacrylate.

100 parts of the product from this example were dissolved in 400 parts of triethylene glycol dimethacrylate, 8 parts of methylethyl ketone peroxide and 0.2 parts of cobalt as naphthenate in 20 parts of toluene. After agitation the material was applied to glass, metal and wood substrates and heated at 60° C. to give a hard, glossy film of superior properties such as enhanced solvent and mar resistance.

EXAMPLE 10

20 parts of the granules as prepared in Example 8 were dissolved in 62 parts of triethylene glycol dimethacrylate, 2 parts methylethyle ketone peroxide and .05 parts of cobalt as naphthenate in 5 parts of toluene. The mixture was shaken thoroughly and the mixture applied to glass, metal and wood substrates and heated at 40° C., when polymerisation took place, to give hard, glossy films.

Example 11

100 parts of the produce from Example 9 were dissolved in a solvent mixture consisting of 100 parts butyl acetate, 90 parts methylethyl ketone, 40 parts methyl isobutyl ketone and 150 parts of toluene. To this were added 2 parts methylethyl ketone peroxide and .05 part of cobalt as naphthenate in 5 parts of toluene. The mixture was agitated and then sprayed on to glass, metal and wood substrates. The solvent volatilised and at the same time polymerisation of the allyl groupings took place at room temperature (20° C.) The coating so formed had superior properties, such as enhanced solvent and mar resistance.

What we claim is:

1. A process for the preparation of vinyl-impregnated nitrocellulose, comprising contacting fibrous or particulate nitrocellulose with vinyl monomer selected from the group consisting of styrene, acrylamide, methacrylamide, and esters of acrylic acid, methacrylic acid, dimethylacrylic acid and maleic acid dissolved in a liquid medium which has substantially no solvent action on the nitrocellulose so that the nitrocellulose becomes impregnated with vinyl monomer.

2. A process as claimed in claim 1 wherein the vinyl monomer is polymerized within the nitrocellulose by heating.

3. A process as claimed in claim 2 wherein the vinyl monomer is polymerized in presence of a polymerisation catalyst.

4. A process as claimed in claim 3 wherein the catalyst comprises benzoyl peroxide.

5. A process as claimed in claim 3 wherein the catalyst is dissolved in the liquid medium.

6. A process as claimed in claim 5 wherein the catalyst is mixed with the vinyl monomer before the monomer is dissolved in the liquid medium.

7. A process as claimed in claim 1 wherein the nitrocellulose comprises dense, particulate nitrocellulose.

8. A process as claimed in claim 1 wherein the quantity of liquid medium is sufficient to hold the nitrocellulose in suspension.

9. A process as claimed in claim 1 wherein the liquid medium comprises water.

10. A process as claimed in claim 9 wherein the liquid medium comprises water-miscible alcohol in which the vinyl monomer is soluble.

11. A process as claimed in claim 10 wherein the ratio of water to alcohol is within the range 1:1 to 19:1.

12. A process as claimed in claim 11 wherein the ratio of water to alcohol is relatively low when the nitrocellulose is first contacted with dissolved vinyl monomer and the liquid medium is thereafter diluted by addition of water.

13. A process as claimed in claim 10 wherein the water-miscible alcohol is at least one alcohol selected from ethanol, n-propanol and isopropanol.

14. A process as claimed in claim 1 wherein the vinyl monomer is completely dissolved in the liquid medium.

15. A process as claimed in claim 1 wherein the nitrocellulose is contacted with vinyl monomer at an elevated temperature.

16. A process as claimed in claim 15 wherein the temperature is at or near the reflux temperature of the liquid medium.

17. A process as claimed in claim 1 wherin the nitrocellulose is contacted with vinyl monomer at a temperature at which substantially no polymerisation of the monomer occurs and the temperature is subsequently raised to effect polymerisation of the monomer.

18. A process as claimed in claim 1 wherein the vinyl monomer in the liquid medium does not exceed 10% by weight of the liquid medium.

19. A process as claimed in claim 1 wherein the vinyl monomer comprises methyl methacrylate, butyl methacrylate, lauryl methacrylate, trimethylolpropane diallyl ether methacrylate, ethyl acrylate, dibutyl maleate, dioctyl maleate, methyl acrylate, 2-ethyl hexylacrylate or triethylene glycol dimethacrylate or mixtures thereof.

20. A vinyl-impregnated nitrocellulose whenever prepared by a process as claimed in claim 1.

References Cited
UNITED STATES PATENTS
2,263,526   11/1941   Thinius _____ 260—17

WILLIAM H. SHORT, Primary Examiner
L. M. PHYNES, Assistant Examiner